(12) United States Patent
Po

(10) Patent No.: US 6,516,124 B2
(45) Date of Patent: Feb. 4, 2003

(54) FIBER FOR ENHANCED ENERGY ABSORPTION

(75) Inventor: Hong Po, Sherborn, MA (US)

(73) Assignee: Optical Power Systems Incorporated, Hopkinton, MA (US)

( * ) Notice: Subject to any disclaimer, the term of this patent is extended or adjusted under 35 U.S.C. 154(b) by 42 days.

(21) Appl. No.: 09/798,148

(22) Filed: Mar. 2, 2001

(65) Prior Publication Data

US 2002/0122645 A1 Sep. 5, 2002

(51) Int. Cl.$^7$ ................................................ G02B 6/02
(52) U.S. Cl. ........................................ 385/126; 385/146
(58) Field of Search ................................ 385/126, 127, 385/123, 146, 147; 372/6

(56) References Cited

U.S. PATENT DOCUMENTS

| | | |
|---|---|---|
| 3,395,331 A | 7/1968 | Snitzer |
| 3,590,248 A | 6/1971 | Chatterton, Jr. |
| 3,808,549 A | 4/1974 | Mauer |
| 4,815,079 A | 3/1989 | Snitzer et al. |
| 4,829,529 A | 5/1989 | Kafka |
| 5,121,460 A * | 6/1992 | Tumminelli et al. ............ 372/6 |
| 5,291,501 A | 3/1994 | Hanna |
| 5,373,576 A * | 12/1994 | Minns et al. ............ 359/341.3 |
| 5,530,710 A * | 6/1996 | Grubb ............................ 372/6 |
| 5,533,163 A | 7/1996 | Muendel |
| 5,864,645 A | 1/1999 | Zellmer et al. |
| 6,081,366 A | 6/2000 | Kildorf et al. |
| 6,101,199 A | 8/2000 | Wang et al. |
| 6,157,763 A | 12/2000 | Grubb et al. |
| 6,345,141 B1 * | 2/2002 | Grubb et al. .................. 372/6 |

FOREIGN PATENT DOCUMENTS

EP 0 903 876 A1 8/1998

* cited by examiner

*Primary Examiner*—Ellen E. Kim
(74) *Attorney, Agent, or Firm*—Fish & Richardson P.C.

(57) ABSTRACT

Fibers, including fiber lasers and fiber amplifiers, and systems containing such fibers are disclosed.

185 Claims, 6 Drawing Sheets

FIBER FOR ENHANCED ENERGY ABSORPTION

TECHNICAL FIELD

The invention relates to fibers, such as fiber lasers and fiber amplifiers, and systems containing such fibers.

BACKGROUND

Fibers, such as fiber lasers and fiber amplifiers, can be used to enhance absorption of pump energy. One type of fiber, commonly referred to as a double clad fiber, includes a core containing an active material, a first cladding around the core, and a second cladding around the first cladding.

SUMMARY

The invention relates to fibers, such as fiber lasers and fiber amplifiers, and systems containing such fibers.

In one aspect, the invention generally features a fiber having a core, a first cladding around the core, and a second cladding around the first cladding. The outer perimeter of the first cladding has at least two substantially flat sides, and the outer perimeter of the second cladding is nonoval-shaped.

In another aspect, the invention generally features a fiber having a core, a first cladding around the core, and a second cladding around the first cladding. The core is formed of an active material. The first cladding has a lower index of refraction than the core. The outer perimeter of the first cladding has at least two substantially flat sides, and the outer perimeter of the second cladding is nonoval-shaped.

In a further aspect, the invention generally features a fiber having a core and a cladding around the core. The cladding has an outer perimeter including two substantially flat sides that are substantially nonperpendicular to each other. The lengths of the two substantially flat sides are different.

In yet a further aspect, the invention generally features a fiber having a core, a first cladding around the core, and a second cladding around the first cladding. The core is formed of an active material. The first cladding has a lower refractive index than the active material. The outer perimeter of the first cladding has two substantially flat sides that substantially nonperpendicular to each other. The lengths of the two substantially flat sides are different side.

In still a further aspect, the invention generally features a fiber having a core, a first cladding around the core, and a second cladding around the first cladding. The first cladding has an outer perimeter with at least two substantially flat sides. The core is substantially centrally disposed with respect to the geometric center of the outer perimeter of the second cladding, and the core is substantially eccentrically disposed with respect to the geometric center of the outer perimeter of the first cladding.

In another aspect, the invention features a fiber having a core, a first cladding around the core, and a second cladding around the first cladding. The core is formed of an active material, and the first cladding has a lower index of refraction than the core. The first cladding has an outer perimeter with at least two substantially flat sides. The core is substantially centrally disposed with respect to the geometric center the outer perimeter of the second cladding, and the core is substantially eccentrically disposed with respect to the geometric center outer perimeter of the first cladding.

In additional aspects, the invention generally features a system containing an energy source and one or more of the foregoing fibers. The energy source can be, for example, a laser. In certain embodiments, the energy source and fiber are arranged in an end pump configuration. In some embodiments, the energy source and fiber are arranged in a side pump configuration.

Embodiments of the above aspects of the invention can include one or more of the following features.

The core can be formed of an active material. The core can be formed of a rare earth ion doped material. The core can be formed of a silica material and at least one rare earth ion. The core can be a single mode core. The core can be a multi-mode core. The fiber can further include an additional material around which the core is disposed. The core can be ring-shaped.

The first cladding can be formed of a silica material.

The second cladding can be formed of a polymeric material.

The core can have a greater index of refraction than the first cladding. The first can have a greater index of refraction than the second cladding.

The outer perimeter of the second cladding can be non-oval shaped (e.g., substantially circular).

The two substantially flat sides can be substantially parallel. The angle between the first and second substantially flat sides can be, for example, from about 2° to about 88°.

The two substantially flat sides can have the same lengths. The two substantially flat sides can have different lengths.

The core can be substantially centrally disposed with respect to the geometric center of the outer perimeter of the second cladding. The core can be substantially eccentrically disposed with respect to the geometric center of the outer perimeter of the first cladding. The core can be closer to a substantially flat side of the outer perimeter of the first cladding that is longer than at least one other (e.g., all other) substantially flat side(s) of the outer perimeter of the first cladding.

The fibers can be, for example, in the form of a fiber laser or a fiber amplifier. Generally, a fiber laser has a lasing cavity (e.g., a resonator) that is used to provide gain for energy at a desired wavelength. Typically, the gain in the cavity for energy at the wavelength of interest exceeds the loss from the cavity for energy at the wavelength of interest. Generally, a fiber amplifier provides gain for energy at a wavelength of interest without the use of a lasing cavity (e.g., without a resonator).

Features, objects and advantages of the invention are in the description, drawings and claims.

DETAILED DESCRIPTION

Figure 1:
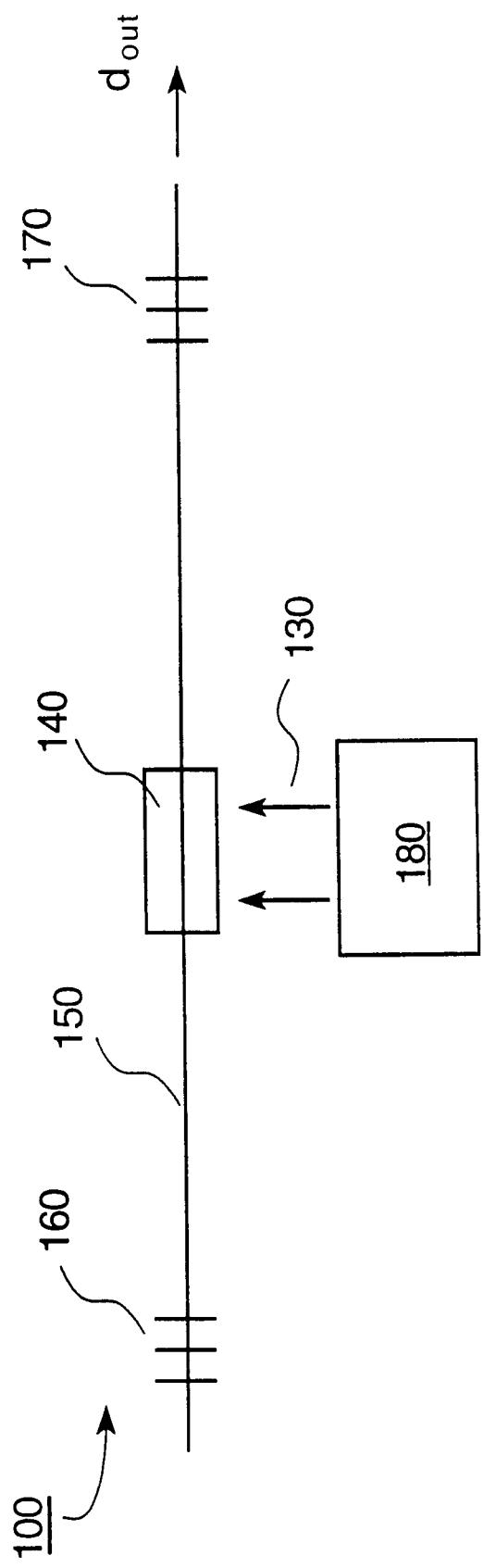
FIG. 1 is a schematic view of an embodiment of a fiber system.

FIG. 1 is a schematic view of an embodiment of a fiber laser system 100 in which a fiber 150 is used as a gain medium. An energy source 180 emits a pump signal 130 that is coupled to fiber 150 via a coupler 140 (see discussion below). A pair of gratings 160 and 170 reflect energy at a desired wavelength ($\lambda_{out}$) within fiber 150. Fiber 150 contains an active material that interacts with the pump signal so that gratings 160 and 170 provide a lasing cavity for energy at $\lambda_{out}$, and fiber 150 acts as a gain medium for energy at $\lambda_{out}$. The reflectance of grating 170 is less than 100% so that a portion of energy at $\lambda_{out}$ in fiber 150 passes through grating 170. While FIG. 1 shows one embodiment of fiber 150 in a fiber laser system, other fiber laser systems in which fiber 150 can be used will be apparent to those of skill in the art.

Figure 2:
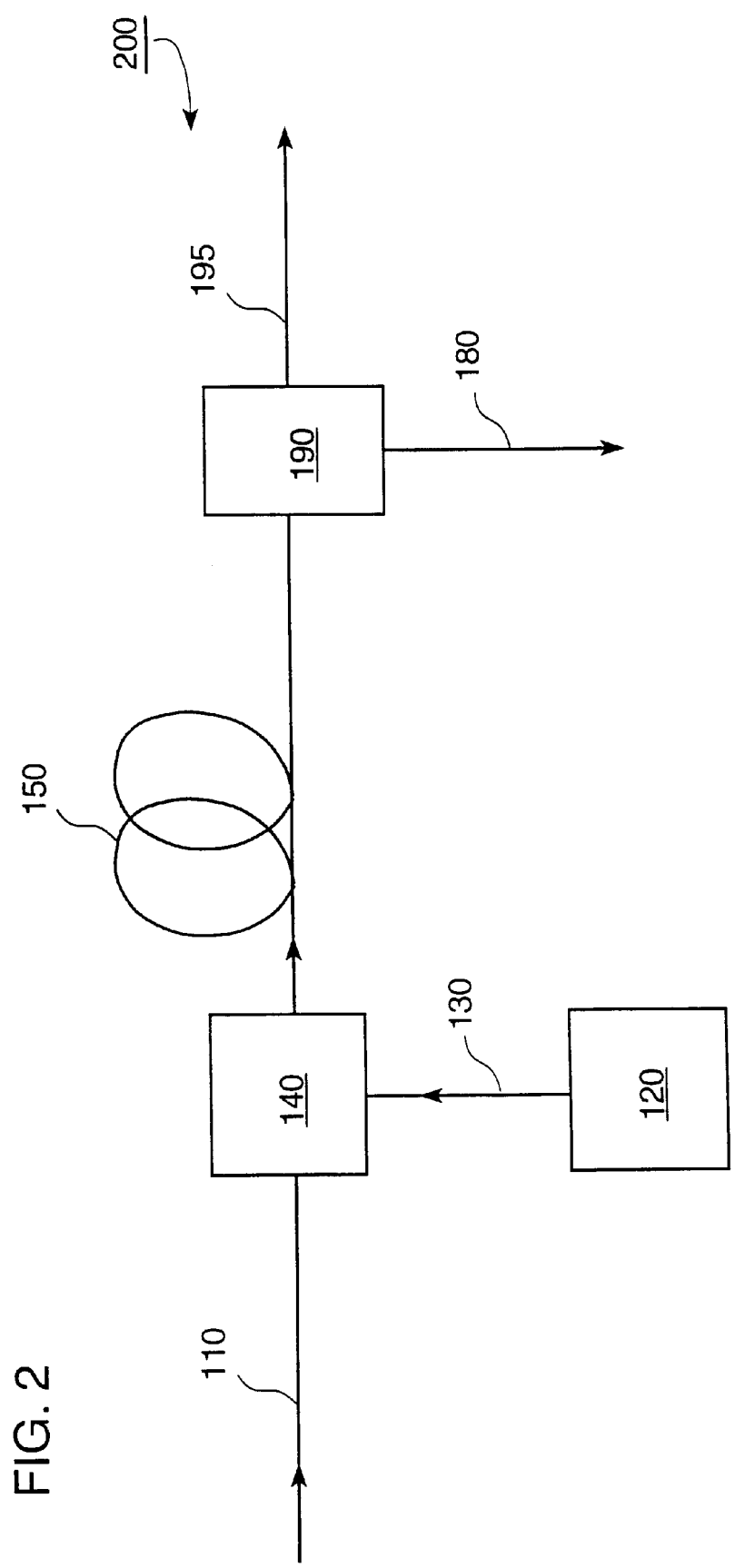
FIG. 2 is a schematic view of an embodiment of a fiber system.

FIG. 2 is a schematic view of an embodiment of a fiber amplifier system 200 in which fiber 150 is used as a signal amplifier. An input signal enters system 200 via fiber 110. Energy source 120 emits a pump signal 130. The input signal in fiber 110 and pump signal 130 are coupled into fiber 150 via coupler 140 (see discussion below). Pump signal 130 interacts with the active material in fiber 150, and the input signal is amplified. A device 190 (e.g., an isolator) separates the amplified input signal from the pump signal so that the pump signal travels along fiber 180, and the amplified input signal travels along fiber 195. While FIG. 2 shows one embodiment of fiber 150 in a fiber amplifier system, other fiber amplifier systems in which fiber 150 can be used will be apparent to those of skill in the art.

Figure 3:
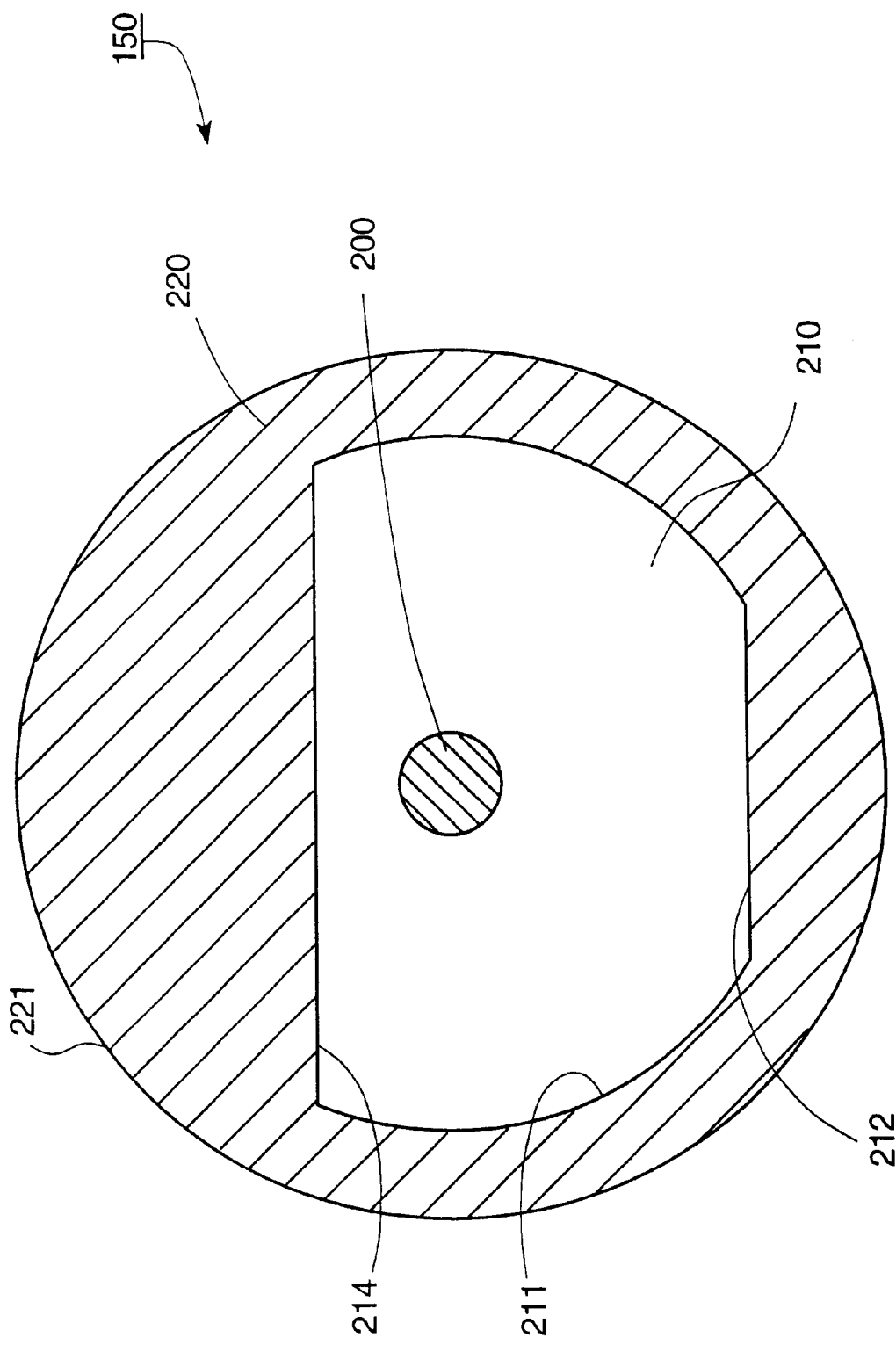
FIG. 3 is a cross-sectional view of an embodiment of a fiber.

FIG. 3 is a cross-sectional view of an embodiment of fiber 150 having a core 200 (e.g., a single mode core), a first cladding 210 and a second cladding 220.

Typically, core 200 includes a first material (e.g., a silica material, such as a fused silica) and at least one dopant (e.g., at least one rare earth ion, such as erbium ions, ytterbium ions, neodymium ions, holmium ions, dysprosium ions and/or thulium ions). More generally, however, core 200 can be formed of any material or combination of materials capable of interacting with the pump signal to enhance pump signal absorption (e.g., produce gain). In certain embodiments, core 200 is formed of fused silica doped with erbium ions.

Core 200 can optionally include certain other materials. For example, core 200 can include one or more materials to increase the index of refraction. Such materials include, for example, germanium oxide. Core 200 can include one or more materials to decrease the index of refraction. Such materials include, for example, boron oxide. Core 200 can include one or more materials (e.g., aluminum oxide) that enhance the solubility of the rare earth ion(s) within core 200 (e.g., within silica, such as fused silica). Core 200 can include one or more materials that enhance the homogeneity of the index of refraction within core 200. An example of such a material is phosphorus pentoxide.

Cladding 210 is usually formed of a material having a lower refractive index than core 200. In some embodiments, core 200 has a refractive index ($n_{200}$) and cladding 210 has a refractive index ($n_{210}$) so that $((n_{200})^2+(n_{210})^2))^{1/2}$ is less than about 0.2 (e.g., less than about 0.17) and greater than about 0.05 (e.g., greater than about 0.12), such as from about 0.12 to about 0.17. Examples of materials from which cladding 210 can be formed include silica materials, such as fused silica materials.

Cladding 210 has an outer perimeter 211 that is substantially circular except for two substantially flat sides 212 and 214. Although FIG. 3 shows that the portions of perimeter 211 other than sides 212 and 214 are substantially circular, other designs can be used. Generally, the portions of perimeter 211 other than sides 212 and 214 are substantially non-flat (e.g., substantially non-flat, oval shaped or substantially non-flat, nonoval-shaped).

In the embodiment shown in FIG. 3, sides 212 and 214 are substantially parallel. More generally, however, sides 212 and 214 are substantially nonperpendicular. In some embodiments, sides 212 and 214 are arranged so that the acute angle between sides 212 and 214 is greater than about 2° (e.g., greater than about 5°, greater than about 10°, greater than about 15°, greater than about 20°, greater than about 25°, greater than about 30°, greater than about 35°, greater than about 40°, greater than about 45°, greater than about 50°, greater than about 55°, greater than about 60°. greater than about 65°, greater than about 70°, greater than about 75°, greater than about 80°, greater than about 85°). In certain embodiments, sides 212 and 214 are arranged so that the acute angle between sides 212 and 214 is less than about 88° (e.g., less than about 85°, less than about 80°, less than about 75°, less than about 70°, less than about 65°, less than about 60°, less than about 55°, less than about 50°. less than about 45°, less than about 40°, less than about 35°, less than about 30°, less than about 25°, less than about 20°, less than about 15°, less than about 10°, less than about 5°).

The lengths of sides 212 and 214 can be the same or different. In certain embodiments, the ratio of the length of side 212 to the length of side 214 is at least about 0.01 (e.g., at least about 0.02, at least about 0.03, at least about 0.04, at least about 0.05, at least about 0.06, at least about 0.07, at least about 0.08, at least about 0.09, at least about 0.1, at least about 0.2, at least about 0.3, at least about 0.4, at least about 0.5, at least about 0.6, at least about 0.7, at least about 0.8, at least about 0.9, at least about 0.95, or at least about 0.97). In some embodiments, the ratio of length of side 212 to the length of side 214 is at most about 0.98 (e.g., at most about 0.97, at most about 0.96, at most about 0.95, at most about 0.94, at most about 0.93, at most about 0.92, at most about 0.91, at most about 0.9, at most about 0.8, at most about 0.7, at most about 0.6, at most about 0.5, at most about 0.4, at most about 0.3, at most about 0.2, at most about 0.1, at most about 0.05 or at most about 0.03).

Cladding 220 is usually formed of a material having a lower refractive index than cladding 210. In some embodiments, claddings 210 and 220 have refractive indices ($n_{210}$) and ($n_{220}$), respectively, so that $((n_{210})^2+(n_{220})^2))^{1/2}$ is less than about 0.6 (e.g., less than about 0.5) and greater than about 0.3 (e.g., greater than about 0.4), such as from about 0.42 to about 0.47. Examples of materials from which cladding 220 can be formed include polymeric materials, such as, for example, acrylate resins, silicone polymers, polyurethane. Such materials can be, for example, fluorinated or nonfluorinated.

As shown in FIG. 3, an outer perimeter 221 of cladding 220 is substantially circular. More generally, other shapes can be used. For example, outer perimeter 221 can be substantially oval, substantially square, substantially rectangular or substantially triangular. Combinations of these shapes can also be used.

Core 200 is substantially eccentrically disposed with respect to the geometric center of outer perimeter 211 of cladding 210 (i.e., core 200 is not disposed in the geometric center of outer perimeter 211 of cladding 210), and core 200 is substantially centrally disposed with respect to the geometric center of outer perimeter 221 of cladding 220. The distance between the center of core 200 and flat side 214 (the longer flat side) is shorter than the distance between the center of core 200 and flat side 212 (the shorter flat side).

With this arrangement, as fiber 150 is bent, substantially flat side 214 tends to be located toward the outer curvature of the bend, and substantially flat side 212 tends to be located toward the inner curvature of the bend. This can be advantageous, for example, when it is desirable to ascertain the location of substantially flat sides 212 and/or 214 relative to the outer curvature and/or inner curvature of fiber 150. This can also be advantageous, for example, when it is desirable to have core 200 disposed in the same position relative to sides 212 and/or 214 alone the length of fiber 150 when fiber 150 is bent.

Without wishing to be bound by theory, it is believed that this arrangement can result in enhanced pump energy absorption relative to an arrangement in which the core is substantially centrally disposed within the outer perimeter of the first cladding. As fiber 150 is bent, it is believed that modes of the pump energy in cladding 210 tend to aggregate toward substantially flat side 214 because side 214 is located toward the outer curvature of the bend. It is believed that, because core 200 is located relatively close to substantially flat side 214, the probability that a given mode of pump energy will interact with core 200 is increased relative to certain other arrangements (e.g., an arrangement in which the core is substantially centrally disposed relative to the outer perimeter of the first cladding), thereby allowing for enhanced pump energy absorption.

It is further believed that pump energy absorption is also enhanced because, when fiber 150 is bent and mode aggregation occurs as discussed above, the effective area of cladding 210 (e.g., the area of cladding 210 carrying the majority of modes of the pump energy) relative to the area of core 200 is increased relative to certain other arrangements (e.g., an arrangement in which the core is substantially centrally disposed relative to the outer perimeter of the first cladding). It is believed that this result is achieved because bending fiber 150 effectively reduces the area of cladding 210 carrying modes of pump energy, thereby increasing the effective ratio of the area of core 200 to cladding 210 in the area in which modes of the pump energy aggregate upon bending.

Other arrangements of the components of fiber 150 are also contemplated. For example, the distance between the center of core 200 and flat side 214 (the longer flat side) can be longer than the distance between the center of core 200 and flat side 212 (the shorter flat side). Alternatively, core 200 can be substantially centrally disposed with respect to the geometric center of outer perimeter 211 of cladding 210.

Fiber 150 can be manufactured using standard techniques. In certain embodiments, fiber 150 can be manufactured using modified chemical vapor deposition. Typically, in this process core 200 is formed inside cladding 210. A preform is prepared having a suitable ratio of the core diameter to the first cladding diameter. One or more substantially flat sides can then be ground on the preform (e.g., corresponding to substantially flat sides 212 and/or 214). Additional glass and fire processes are conducted to prepare the final preform. The fiber is then drawn from the final preform.

Figure 4:
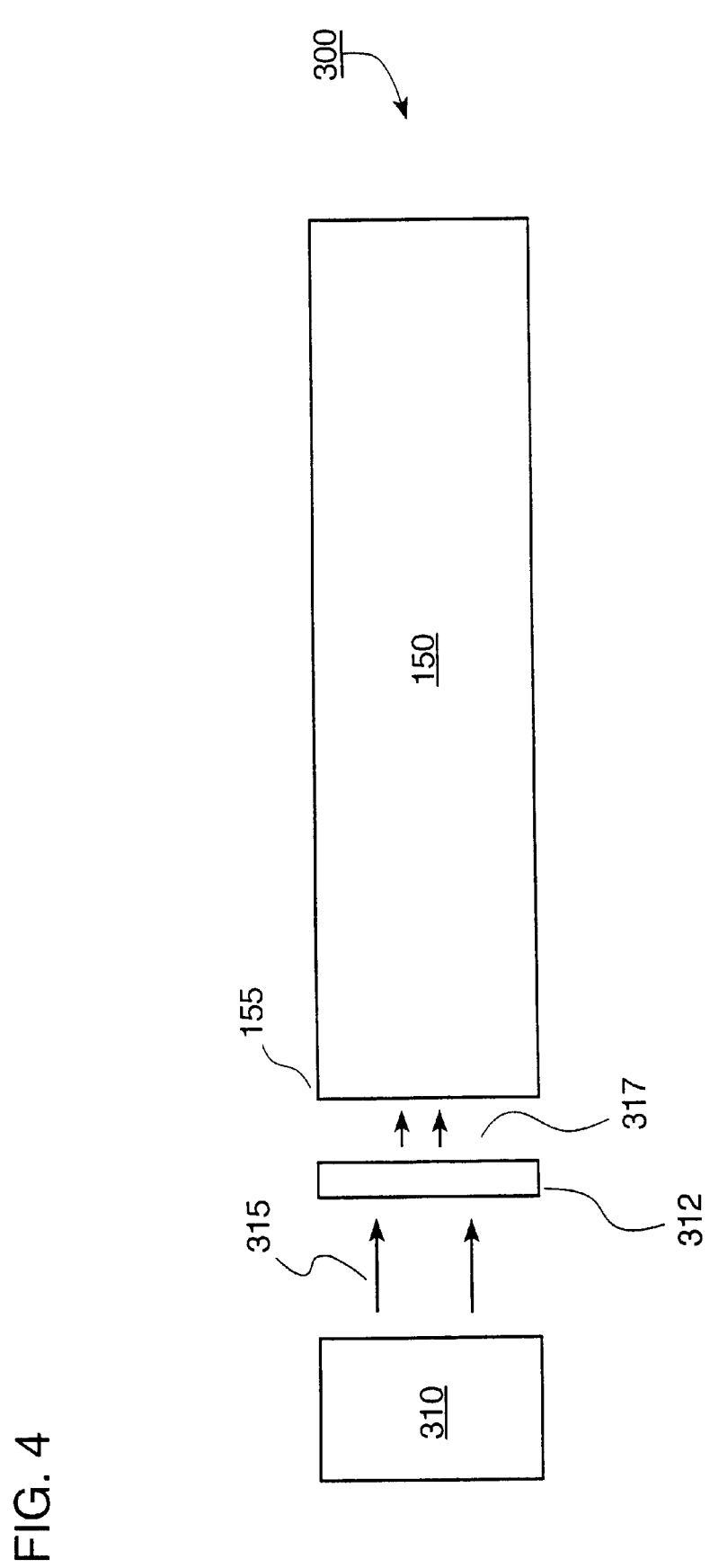
FIG. 4 is a schematic view of an embodiment of a fiber system.

FIG. 4 shows an embodiment of a system 300 containing an energy source 310 coupled to fiber 150 in an end pump configuration. Energy 315 emanating from source 310 irradiates a lens 312 that directs a focused beam 317 at of the energy at an end portion 155 of fiber 150. Energy source 310 can be, for example, a laser, such as a semiconductor diode laser. In certain embodiments, energy source 310 is a semiconductor diode laser that irradiates end portion 155 with energy at a wavelength of about 915 nanometers or about 980 nanometers. In these embodiments, core 200 can contain, for example, ytterbium ions.

Figure 5:
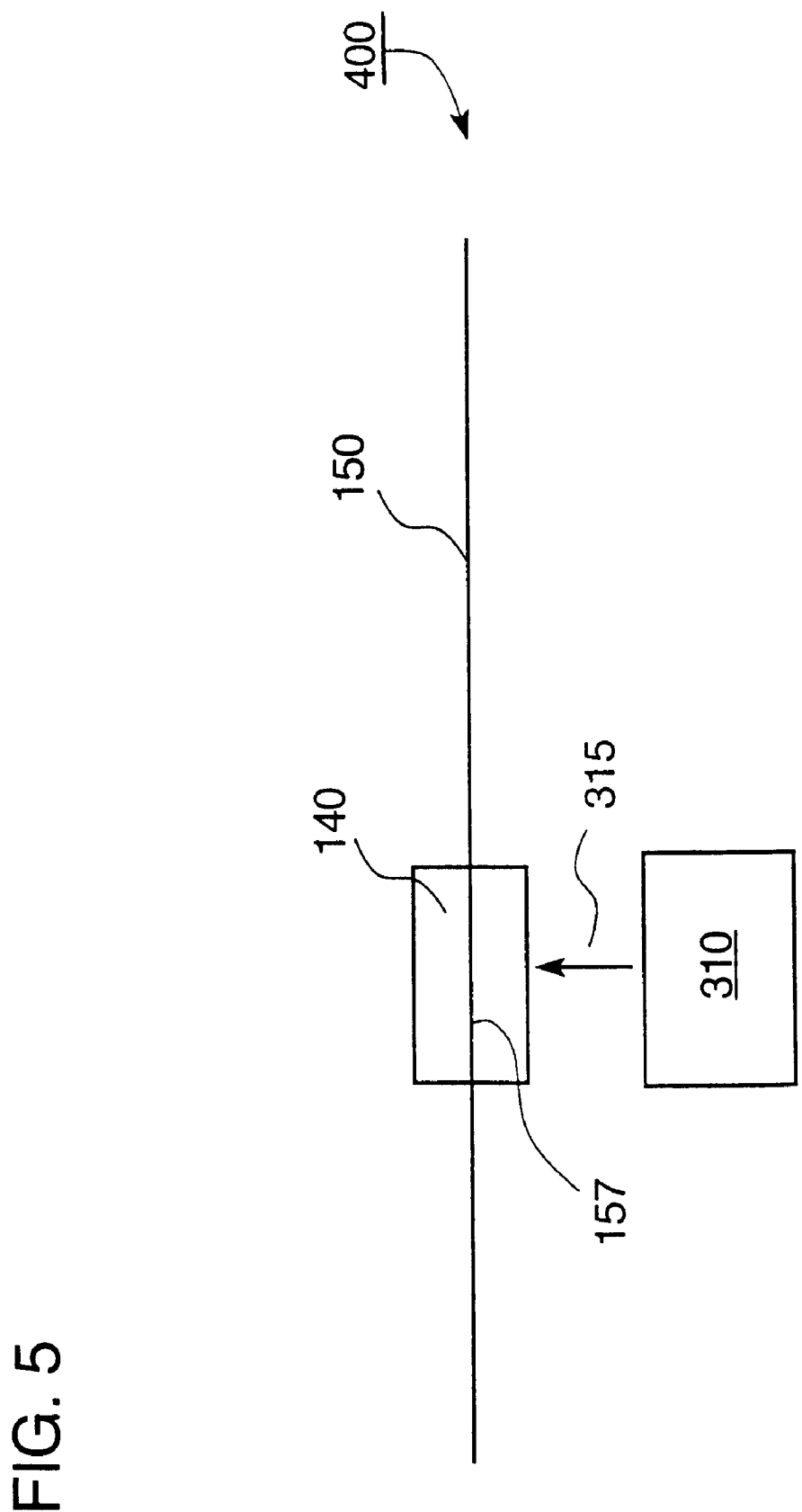
FIG. 5 is a schematic view of an embodiment of a fiber system.

FIG. 5 shows an embodiment of a system 400 containing energy source 310 and fiber 150 in a side pump configuration. Energy 315 emanating from source 310 irradiates a side portion 157 of fiber 150 and is coupled to core 200 and cladding 210 via coupler 140. Such couplers are known to those skilled in the art. For example, in certain embodiments, coupler 140 is a V-shaped groove (e.g., a 90° V-shaped groove) cut into claddings 210 and 220 on the side of fiber 150 opposite to portion 157. In some embodiments, coupler 140 is a removed a portion of cladding 220 that is replaced with a prism having substantially the same refractive index as cladding 210. In other embodiments, coupler 140 is a removed portion of cladding 220 that is replaced with a coupling window.

Figure 6:
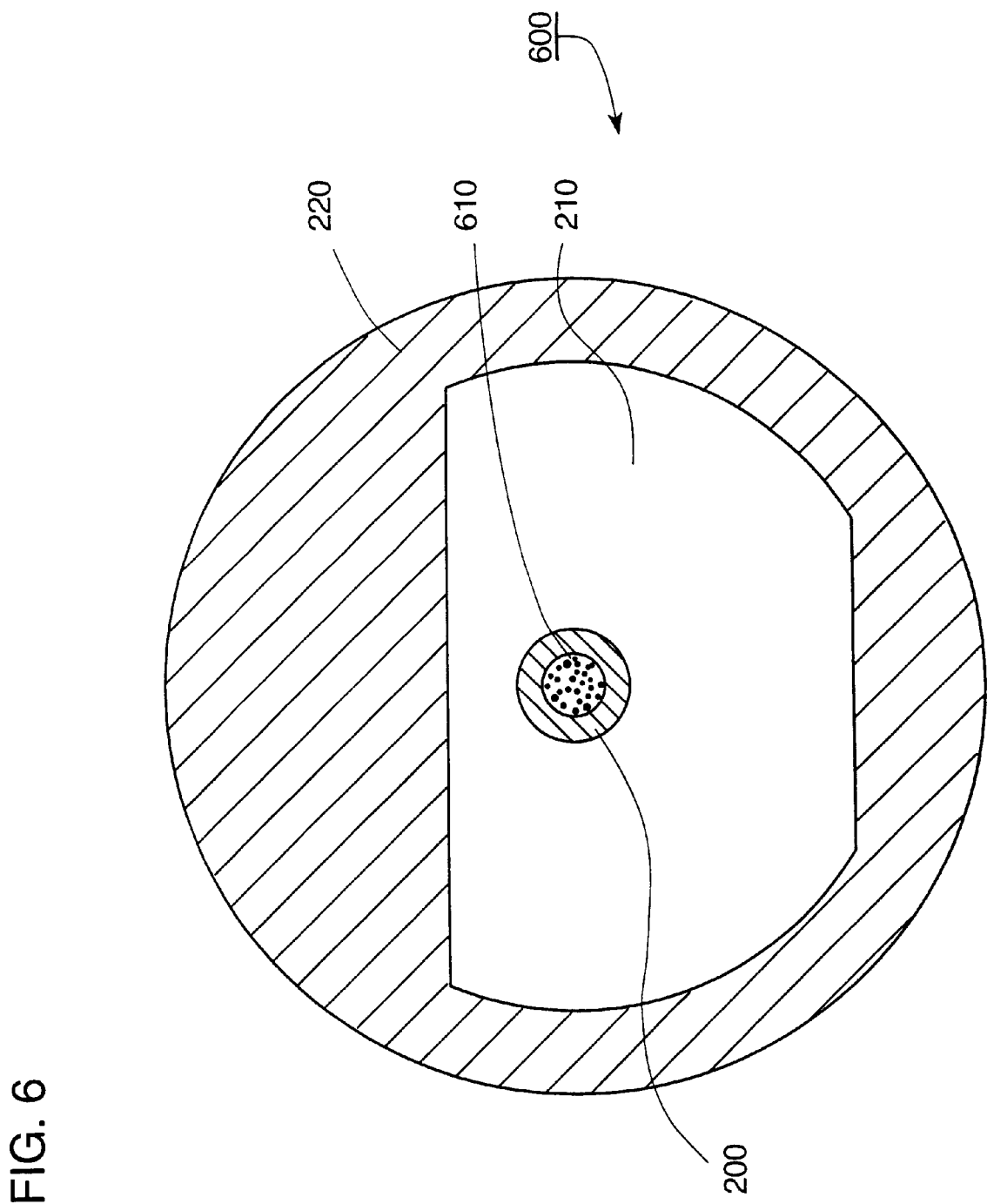
FIG. 6 is a cross-sectional view of an embodiment of a laser.

FIG. 6 is a cross-sectional view of an alternate embodiment of a fiber 600 that can be used in addition to or as a replacement for fiber 150 in systems 100, 200, 300 and/or 400. Fiber 600 has a core (e.g., a multimode core) formed of an inner material 610, a ring-shaped portion of core material (e.g., an active material) 200 around material 610. and claddings 210 and 220. Material 610 can have a refractive index ($n_{610}$) and core 200 can have a refractive index ($n_{200}$) so that $((n_{200})^2+(n_{610})^2))^{1/2}$ is less than about 0.2 (e.g., less than about 0.17) and greater than about 0.05 (e.g., greater than about 0.12), such as from about 0.12 to about 0.17. Examples of materials from which materials that can be used for material 610 include silica materials, such as fused silica materials. In certain embodiments, material 610 and cladding 210 are formed of the same material. In some embodiments, material 610 and cladding 210 are formed of different materials.

While certain embodiments of the invention have been disclosed herein, the invention is not limited to these embodiments. For example, a fiber can include additional layers of material. These layers of material can be, for example, adhesive layers, mechanical support layers, and/or protective layers (e.g., chemically protective layers and/or physically protective layers). Alternatively or additionally, a fiber can include a stiffening member (e.g., a metal rod) disposed along one side so that upon bending the stiffening member is preferentially oriented along the inner curvature of the bend of the fiber, thereby assisting in determining the location of the core within the fiber.

What is claimed is:

1. A fiber, comprising:
   a core;
   a first cladding around the core, the first cladding having an outer perimeter with at least two substantially flat sides and at least one curved side; and
   a second cladding around the first cladding, the second cladding having a nonoval-shaped outer perimeter,
   wherein the core is substantially eccentrically disposed with respect to a geometric center of the outer perimeter of the first cladding.

2. The fiber of claim 1, wherein the core comprises an active material.

3. The fiber of claim 1, wherein the core comprises a rare earth ion doped material.

4. The fiber of claim 1, wherein the core comprises a silica material and at least one rare earth ion.

5. The fiber of claim 1, wherein the core comprises a single mode core.

6. The fiber of claim 1, wherein the core comprises a multi-mode core.

7. The fiber of claim 1, further comprising an inner material, the core being disposed around the inner material.

8. The fiber of claim 7, wherein the core is ring-shaped.

9. The fiber of claim 1, wherein the core is ring-shaped.

10. The fiber of claim 1, wherein the first cladding comprises a silica material.

11. The fiber of claim 1, wherein the second cladding comprises a polymeric material.

12. The fiber of claim 1, wherein the core has an index of refraction and the first cladding has an index of refraction, the index of refraction of the core being greater than the index of refraction of the first cladding.

13. The fiber of claim 12, wherein the second cladding has an index of refraction, the index of refraction of the first cladding being greater than the index of refraction of the second cladding.

14. The fiber of claim 1, wherein the nonoval-shaped outer perimeter of the second cladding is substantially circular.

15. The fiber of claim 1, wherein the at least two substantially flat sides comprise only two substantially flat sides.

16. The fiber of claim 15, wherein the two substantially flat sides are substantially parallel.

17. The fiber of claim 1, wherein the at least two substantially flat sides comprise first and second substantially flat sides, the first substantially flat side having a first length, the second substantially flat side having a second length, and the first length being different than the second length.

18. The fiber of claim 1, wherein the core is substantially centrally disposed with respect to a geometric center of the outer perimeter of the second cladding.

19. The fiber of claim 1, wherein the fiber is in the form of a fiber laser.

20. The fiber of claim 1, wherein the fiber is in the form of a fiber amplifier.

21. A fiber, comprising:
   a core comprising an active material having an index of refraction;
   a first cladding comprising a material having an index of refraction that is less than the index of refraction of the core, the first cladding being around the core and having an outer perimeter with at least two substantially flat sides and at least one curved side; and
   a second cladding around the first cladding, the second cladding having a substantially circular outer perimeter,
   wherein the core is substantially eccentrically disposed with respect to a geometric center of the outer perimeter of the first cladding.

22. The fiber of claim 21, wherein the active material comprises a rare earth ion.

23. The fiber of claim 22, wherein the core further comprises a silica material.

24. The fiber of claim 21, wherein the core further comprises a silica material.

25. The fiber of claim 21, wherein the core comprises a single mode core.

26. The fiber of claim 21, wherein the core comprises a multi-mode core.

27. The fiber of claim 26, further comprising an inner material, the core being disposed around the inner material.

28. The fiber of claim 27, wherein the core is ring-shaped.

29. The fiber of claim 21, further comprising an inner material, the core being disposed around the inner material.

30. The fiber of claim 29, wherein the core is ring-shaped.

31. The fiber of claim 21, wherein the core is ring-shaped.

32. The fiber of claim 21, wherein the first cladding comprises a silica material.

33. The fiber of claim 32, wherein the active material comprises a rare earth ion.

34. The fiber of claim 33, wherein the core further comprises a silica material.

35. The fiber of claim 32, wherein the core further comprises a silica material.

36. The fiber of claim 21, wherein the second cladding comprises a polymeric material.

37. The fiber of claim 36, wherein the first cladding comprises a silica material.

38. The fiber of claim 37, wherein the active material comprises a rare earth ion.

39. The fiber of claim 38, wherein the core further comprises a silica material.

40. The fiber of claim 37, wherein the core further comprises a silica material.

41. The fiber of claim 36, wherein the active material comprises a rare earth ion.

42. The fiber of claim 41, wherein the core further comprises a silica material.

43. The fiber of claim 36, wherein the core further comprises a silica material.

44. The fiber of claim 21, wherein the at least two substantially flat sides comprise only two substantially flat sides.

45. The fiber of claim 44, wherein the two substantially flat sides are substantially parallel.

46. The fiber of claim 21, wherein the at least two substantially flat sides comprise first and second substantially flat sides, the first substantially flat side having a first length, the second substantially flat side having a second length, and the first length being different than the second length.

47. The fiber of claim 21, wherein the core is substantially centrally disposed with respect to a geometric center of the outer perimeter of the second cladding.

48. The fiber of claim 21, wherein the fiber is in the form of a fiber laser.

49. The fiber of claim 21, wherein the fiber is in the form of a fiber amplifier.

50. A fiber, comprising:
   a core;
   a first cladding around the core, the first cladding having an outer perimeter including first and second substantially flat sides and at least one curved side, the first substantially flat side being substantially nonperpendicular to the second substantially flat side, the first substantially flat side having a first length, the second substantially flat side having a second length, and the first length being different than the second length; and
   a second cladding around the first cladding,
   wherein the core is substantially eccentrically disposed with respect to a geometric center of the outer perimeter of the first cladding.

51. The fiber of claim 50, wherein the core comprises an active material.

52. The fiber of claim 50, wherein the core comprises a rare earth ion doped material.

53. The fiber of claim 50, wherein the core comprises a silica material and at least one rare earth ion.

54. The fiber of claim 50, wherein the core comprises a single mode core.

55. The fiber of claim 50, wherein the core comprises a multi-mode core.

56. The fiber of claim 50, further comprising an inner material, the core being disposed around the inner material.

57. The fiber of claim 56, wherein the core is ring-shaped.

58. The fiber of claim 50, wherein the core is ring-shaped.

59. The fiber of claim 50, wherein the first cladding comprises a silica material.

60. The fiber of claim 50, wherein the second cladding comprises a polymeric material.

61. The fiber of claim 50, wherein the core has an index of refraction and the first cladding has an index of refraction, the index of refraction of the core being greater than the index of refraction of the first cladding.

62. The fiber of claim 61, wherein the second cladding has an index of refraction, and the index of refraction of the first cladding is greater than the index of refraction of the second cladding.

63. The fiber of claim 50, wherein the second cladding has a nonoval-shaped outer perimeter.

64. The fiber of claim 63, wherein the nonoval-shaped outer perimeter of the second cladding is substantially circular.

65. The fiber of claim 50, wherein an angle between the first and second substantially flat sides is from about 2° to about 88°.

66. The fiber of claim 50, wherein the first and second substantially flat sides are substantially parallel.

67. The fiber of claim 50, wherein the core is substantially centrally disposed with respect to a geometric center of the outer perimeter of the second cladding.

68. The fiber of claim 50, wherein the fiber is in the form of a fiber laser.

69. The fiber of claim 50, wherein the fiber is in the form of a fiber amplifier.

70. A fiber, comprising:
a core comprising an active material having an index of refraction;
a first cladding comprising a material having an index of refraction less than the index of refraction of the core, the first cladding being around the core and having an outer perimeter including first and second substantially flat sides and at least one curved side, the first substantially flat side being substantially nonperpendicular to the second substantially flat side, the first substantially flat side having a first length, the second substantially flat side having a second length, and the first length being different than the second length; and
a second cladding around the first cladding,
wherein the core is substantially eccentrically disposed with respect to a geometric center of the outer perimeter of the first cladding.

71. The fiber of claim 70, wherein the active material comprises a rare earth ion.

72. The fiber of claim 71, wherein the core further comprises a silica material.

73. The fiber of claim 70, wherein the core further comprises a silica material.

74. The fiber of claim 70, wherein the core comprises a single mode core.

75. The fiber of claim 70, wherein the core comprises a multi-mode core.

76. The fiber of claim 75, further comprising an inner material, the core being disposed around the inner material.

77. The fiber of claim 76, wherein the core is ring-shaped.

78. The fiber of claim 70, further comprising an inner material, the core being disposed around the inner material.

79. The fiber of claim 78, wherein the core is ring-shaped.

80. The fiber of claim 70, wherein the core is ring-shaped.

81. The fiber of claim 70, wherein the first cladding comprises a silica material.

82. The fiber of claim 81, wherein the active material comprises a rare earth ion.

83. The fiber of claim 82, wherein the core further comprises a silica material.

84. The fiber of claim 81, wherein the core further comprises a silica material.

85. The fiber of claim 70, wherein the second cladding comprises a polymeric material.

86. The fiber of claim 85, wherein the first cladding comprises a silica material.

87. The fiber of claim 86, wherein the active material comprises a rare earth ion.

88. The fiber of claim 87, wherein the core further comprises a silica material.

89. The fiber of claim 86, wherein the core further comprises a silica material.

90. The fiber of claim 85, wherein the active material comprises a rare earth ion.

91. The fiber of claim 90, wherein the core further comprises a silica material.

92. The fiber of claim 85, wherein the core further comprises a silica material.

93. The fiber of claim 70, wherein an angle between the first and second substantially flat sides is from about 2° to about 88°.

94. The fiber of claim 70, wherein the two substantially flat sides are substantially parallel.

95. The fiber of claim 70, wherein the core is substantially centrally disposed with respect to a geometric center of the outer perimeter of the second cladding.

96. The fiber of claim 70, wherein second cladding has a nonoval-shaped outer perimeter.

97. The fiber of claim 96, wherein the nonoval-shaped outer perimeter of the second cladding is substantially circular.

98. The fiber of claim 70, wherein the fiber is in the form of a fiber amplifier.

99. The fiber of claim 70, wherein the fiber is in the form of a fiber laser.

100. A fiber, comprising:
a core;
a first cladding around the core, the first cladding having an outer perimeter with at least two substantially flat sides and at least one curved side; and
a second cladding around the first cladding, the second cladding having an outer perimeter,
wherein the core is substantially centrally disposed with respect to a geometric center of the outer perimeter of the second cladding, and the core is substantially eccentrically disposed with respect to a geometric center the outer perimeter of the first cladding.

101. The fiber of claim 100, wherein the core comprises an active material.

102. The fiber of claim 100, wherein the core comprises a rare earth ion doped material.

103. The fiber of claim 100, wherein the core comprises a silica material and at least one rare earth ion.

104. The fiber of claim 100, wherein the core comprises a single mode core.

105. The fiber of claim 100, wherein the core comprises a multi-mode core.

106. The fiber of claim 100, further comprising an inner material, the core being disposed around the inner material.

107. The fiber of claim 106, wherein the core is ring-shaped.

108. The fiber of claim 100, wherein the core is ring-shaped.

109. The fiber of claim 100, wherein the first cladding comprises a silica material.

110. The fiber of claim 100, wherein the second cladding comprises a polymeric material.

111. The fiber of claim 100, wherein the core has an index of refraction and the first cladding has an index of refraction, the index of refraction of the core being greater than the index of refraction of the first cladding.

112. The fiber of claim 111, wherein the second cladding has an index of refraction, the index of refraction of the first cladding being greater than the index of refraction of the second cladding.

113. The fiber of claim 100, wherein the outer perimeter of the second cladding is nonoval-shaped.

114. The fiber of claim 113, wherein the nonoval-shaped outer perimeter of the second cladding is substantially circular.

115. The fiber of claim 100, wherein the at least two substantially flat sides comprise only two substantially flat sides.

116. The fiber of claim 115, wherein the two substantially flat sides are substantially parallel.

117. The fiber of claim 100, wherein the at least two substantially flat sides comprise first and second substantially flat sides, the first substantially flat side having a first length, the second substantially flat side having a second length, and the first length being different than the second length.

118. The fiber of claim 100, wherein the fiber is in the form of a fiber laser.

119. The fiber of claim 100, wherein the fiber is in the form of a fiber amplifier.

120. A fiber, comprising:
a core comprising an active material having an index of refraction;
a first cladding comprising a material having an index of refraction that is less than the index of refraction of the core, the first cladding being around the core and having an outer perimeter with at least two substantially flat sides and at least one curved side; and
a second cladding around the first cladding, the second cladding having an outer perimeter,
wherein the core is substantially centrally disposed with respect to a geometric center of the outer perimeter of the second cladding, and the core is substantially eccentrically disposed with respect to a geometric center of the outer perimeter of the first cladding.

121. The fiber of claim 120, wherein the active material comprises a rare earth ion.

122. The fiber of claim 121, wherein the core further comprises a silica material.

123. The fiber of claim 120, wherein the core further comprises a silica material.

124. The fiber of claim 120, wherein the core comprises a single mode core.

125. The fiber of claim 120, wherein the core comprises a multi-mode core.

126. The fiber of claim 125, further comprising an inner material, the core being disposed around the inner material.

127. The fiber of claim 126, wherein the core is ring-shaped.

128. The fiber of claim 120, further comprising an inner material, the core being disposed around the inner material.

129. The fiber of claim 128, wherein the core is ring-shaped.

130. The fiber of claim 120, wherein the core is ring-shaped.

131. The fiber of claim 120, wherein the first cladding comprises a silica material.

132. The fiber of claim 131, wherein the active material comprises a rare earth ion.

133. The fiber of claim 132, wherein the core further comprises a silica material.

134. The fiber of claim 131, wherein the core further comprises a silica material.

135. The fiber of claim 120, wherein the second cladding comprises a polymeric material.

136. The fiber of claim 135, wherein the first cladding comprises a silica material.

137. The fiber of claim 136, wherein the active material comprises a rare earth ion.

138. The fiber of claim 137, wherein the core further comprises a silica material.

139. The fiber of claim 136, wherein the core further comprises a silica material.

140. The fiber of claim 135, wherein the active material comprises a rare earth ion.

141. The fiber of claim 140, wherein the core further comprises a silica material.

142. The fiber of claim 135, wherein the core further comprises a silica material.

143. The fiber of claim 120, wherein second cladding has a nonoval-shaped outer perimeter.

144. The fiber of claim 143, wherein the nonoval-shaped outer perimeter of the second cladding is substantially circular.

145. The fiber of claim 120, wherein the at least two substantially flat sides comprise only two substantially flat sides.

146. The fiber of claim 145, wherein the two substantially flat sides are substantially parallel.

147. The fiber of claim 120, wherein the at least two substantially flat sides comprise first and second substantially flat sides, the first substantially flat side having a first length, the second substantially flat side having a second length, and the first length being different than the second length.

148. The fiber of claim 120, wherein the fiber is in the form of a fiber laser.

149. The fiber of claim 120, wherein the fiber is in the form of a fiber amplifier.

150. A system, comprising:
an energy source; and
a fiber, comprising:
a core;
a first cladding around the core, the first cladding having an outer perimeter with at least two substantially flat sides and at least one curved side; and
a second cladding around the first cladding, the second cladding having a nonoval-shaped outer perimeter,
wherein, when the energy source emits energy, the energy can propagate along the fiber, and the core is substantially eccentrically disposed with respect to a geometric center of the outer perimeter of the first cladding.

151. The system of claim 150, wherein the energy source is a laser.

152. The system of claim 150, wherein the energy source and the fiber are in an end pump configuration.

153. The system of claim 150, wherein the energy source and the fiber are in a side pump configuration.

154. The system of claim 150, wherein the fiber is in the form of a fiber laser.

155. The system of claim 150, wherein the fiber is in the form of a fiber amplifier.

156. A system, comprising:
an energy source; and
a fiber, comprising:
- a core comprising an active material having an index of refraction;
- a first cladding comprising a material having an index of refraction that is less than the index of refraction of the core, the first cladding being around the core and having an outer perimeter with at least two substantially flat sides and at least one curved side; and
- a second cladding around the first cladding, the second cladding having a substantially circular outer perimeter,
wherein, when the energy source emits energy, the energy can propagate along the fiber, and the core is substantially eccentrically disposed with respect to a geometric center of the outer perimeter of the first cladding.

157. The system of claim 156, wherein the energy source is a laser.

158. The system of claim 156, wherein the energy source and the fiber are in an end pump configuration.

159. The system of claim 156, wherein the energy source and the fiber are in a side pump configuration.

160. The system of claim 156, wherein the fiber is in the form of a fiber laser.

161. The system of claim 156, wherein the fiber is in the form of a fiber amplifier.

162. A system, comprising:
an energy source; and
a fiber, comprising:
- a core;
- a first cladding around the core, the first cladding having an outer perimeter including first and second substantially flat sides and at least one curved side, the first substantially flat side being substantially nonperpendicular to the second substantially flat side, the first substantially flat side having a first length, the second substantially flat side having a second length, and the first length being different than the second length; and
- a second cladding around the first cladding,
wherein, when the energy source emits energy, the energy can propagate along the fiber, and the core is substantially eccentrically disposed with respect to a geometric center of the outer perimeter of the first cladding.

163. The system of claim 162, wherein the energy source is a laser.

164. The system of claim 162, wherein the energy source and the fiber are in an end pump configuration.

165. The system of claim 162, wherein the energy source and the fiber are in a side pump configuration.

166. The system of claim 162, wherein the fiber is in the form of a fiber laser.

167. The system of claim 162, wherein the fiber is in the form of a fiber amplifier.

168. A system, comprising:
an energy source; and
a fiber, comprising:
- a core comprising an active material having an index of refraction;
- a first cladding comprising a material having an index of refraction less than the index of refraction of the core, the first cladding being around the core and having an outer perimeter including first and second substantially flat sides and at least one curved side, the first substantially flat side being substantially nonperpendicular to the second substantially flat side, the first substantially flat side having a first length, the second substantially flat side having a second length, and the first length being different than the second length; and
- a second cladding around the first cladding,
wherein, when the energy source emits energy, the energy can propagate along the fiber, and the core is substantially eccentrically disposed with respect to a geometric center of the outer perimeter of the first cladding.

169. The system of claim 168, wherein the energy source is a laser.

170. The system of claim 168, wherein the energy source and the fiber are in an end pump configuration.

171. The system of claim 168, wherein the energy source and the fiber are in a side pump configuration.

172. The system of claim 168, wherein the fiber is in the form of a fiber laser.

173. The system of claim 168, wherein the fiber is in the form of a fiber amplifier.

174. A system, comprising:
an energy source; and
a fiber, comprising:
- a core;
- a first cladding around the core, the first cladding having an outer perimeter with at least two substantially flat sides and at least one curved side; and
- a second cladding around the first cladding, the second cladding having an outer perimeter,
wherein the core is substantially centrally disposed with respect to a geometric center of the outer perimeter of the second cladding, the core is substantially eccentrically disposed with respect to a geometric center the outer perimeter of the first cladding, and, when the energy source emits energy, the energy can propagate along the fiber.

175. The system of claim 174, wherein the energy source is a laser.

176. The system of claim 174, wherein the energy source and the fiber are in an end pump configuration.

177. The system of claim 174, wherein the energy source and the fiber are in a side pump configuration.

178. The system of claim 174, wherein the fiber is in the form of a fiber laser.

179. The system of claim 174, wherein the fiber is in the form of fiber amplifier.

180. A system, comprising:
an energy source; and
a fiber, comprising:
- a core comprising an active material having an index of refraction;
- a first cladding comprising a material having an index of refraction that is less than the index of refraction of the core, the first cladding being around the core and having an outer perimeter with at least two substantially flat sides and at least one curved side; and
- a second cladding around the first cladding, the second cladding having an outer perimeter,
wherein the core is substantially centrally disposed with respect to a geometric center of the outer perimeter of the second cladding, the core is substantially eccentrically disposed with respect to a geometric center of the outer perimeter of the first cladding, and, when the energy source emits energy, the energy can propagate along the fiber.

181. The system of claim 180, wherein the energy source is a laser.

182. The system of claim 180, wherein the energy source and the fiber are in an end pump configuration.

183. The system of claim 180, wherein the energy source and the fiber are in a side pump configuration.

184. The system of claim 180, wherein the fiber is in the form of a fiber laser.

185. The system of claim 180, wherein the fiber is in the form of a fiber amplifier.

* * * * *